(12) United States Patent
Hellgren

(10) Patent No.: US 12,227,189 B2
(45) Date of Patent: Feb. 18, 2025

(54) METHOD FOR CONTROLLING A VEHICLE

(71) Applicant: VOLVO TRUCK CORPORATION, Gothenburg (SE)

(72) Inventor: Jonas Hellgren, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 100 days.

(21) Appl. No.: 17/757,551

(22) PCT Filed: Dec. 18, 2019

(86) PCT No.: PCT/EP2019/086038
§ 371 (c)(1),
(2) Date: Jun. 16, 2022

(87) PCT Pub. No.: WO2021/121583
PCT Pub. Date: Jun. 24, 2021

(65) Prior Publication Data
US 2023/0271614 A1    Aug. 31, 2023

(51) Int. Cl.
*B60W 30/188* (2012.01)
*B60W 50/00* (2006.01)
(Continued)

(52) U.S. Cl.
CPC ....... *B60W 30/188* (2013.01); *G01C 21/3453* (2013.01); *B60W 2050/0031* (2013.01); *B60W 2520/00* (2013.01); *B60W 2556/10* (2020.02)

(58) Field of Classification Search
None
See application file for complete search history.

(56) References Cited

U.S. PATENT DOCUMENTS

| | | | |
|---|---|---|---|
| 2012/0197504 A1* | 8/2012 | Sujan | G01C 21/3469 701/1 |
| 2014/0277835 A1 | 9/2014 | Filev et al. | |
| 2021/0009128 A1* | 1/2021 | Jokela | B60W 30/18163 |

FOREIGN PATENT DOCUMENTS

| | | |
|---|---|---|
| DE | 102017124953 B4 * | 5/2019 |
| EP | 2886410 A1 | 6/2015 |

(Continued)

OTHER PUBLICATIONS

International Search Report and Written Opinion in corresponding International Application No. PCT/EP2019/086038 mailed Apr. 24, 2020 (12 pages).

(Continued)

*Primary Examiner* — Aniss Chad
*Assistant Examiner* — Madison R. Inserra
(74) *Attorney, Agent, or Firm* — Venable LLP; Jeffri A. Kaminski

(57) ABSTRACT

A method for controlling a vehicle travelling along a route is provided. The method includes obtaining a first value of a balance parameter, indicative of a balance between a cost for operating the vehicle along at least a part of the route, and a time of arrival at a position along the route, establishing, in dependence on the first balance parameter value, a plurality of desired position and time correlations for the travel of the vehicle along at least a part of the route, when the vehicle travels along the route, determining a progress deviation comprising a deviation, for a point in time, of an actual position of the vehicle from a desired position according to the desired position and time correlations, or a deviation, for a position of the vehicle, of an actual point in time from a desired point in time according to the desired position and time correlations, when the vehicle travels along the route, obtaining a second balance parameter value, different from the first balance parameter value, the second (Continued)

balance parameter value being dependent on the progress deviation, and controlling the vehicle in dependence on the second balance parameter value.

20 Claims, 9 Drawing Sheets

(51) Int. Cl.
*G01C 21/34* (2006.01)
*B60W 20/12* (2016.01)

(56) References Cited

FOREIGN PATENT DOCUMENTS

| WO | 2012088534 A1 | 6/2012 | |
|---|---|---|---|
| WO | WO-2020229116 A1 * | 11/2020 | ........ B60W 50/0098 |
| WO | 2020259828 A1 | 12/2020 | |

OTHER PUBLICATIONS

Hellström et al; "Look-ahead control for heavy trucks to minimize trip time and fuel consumption"; Linköping University, Linköping, Sweden; In: Control Engineering Practice, ISSN 0967-0661, E-ISSN 1873-6939, 2009. vol. 17, No. 2, pp. 245-254; URN: urn:nbn:se:liu:diva-16629; DOI: 10.1016/j.conengprac.2008.07.005 (21 pages).

\* cited by examiner

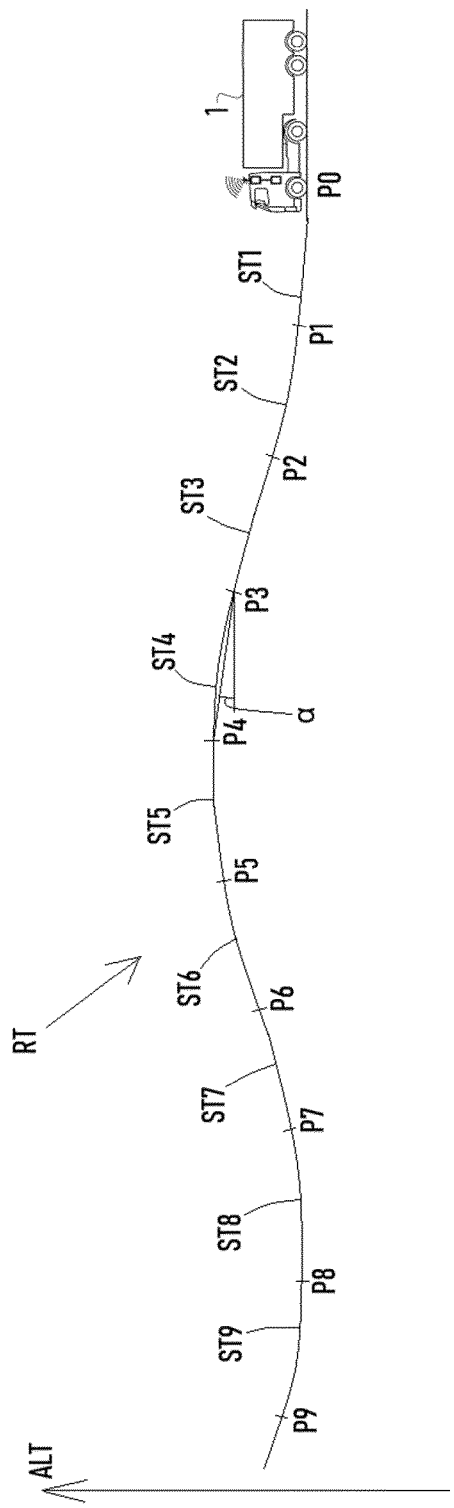

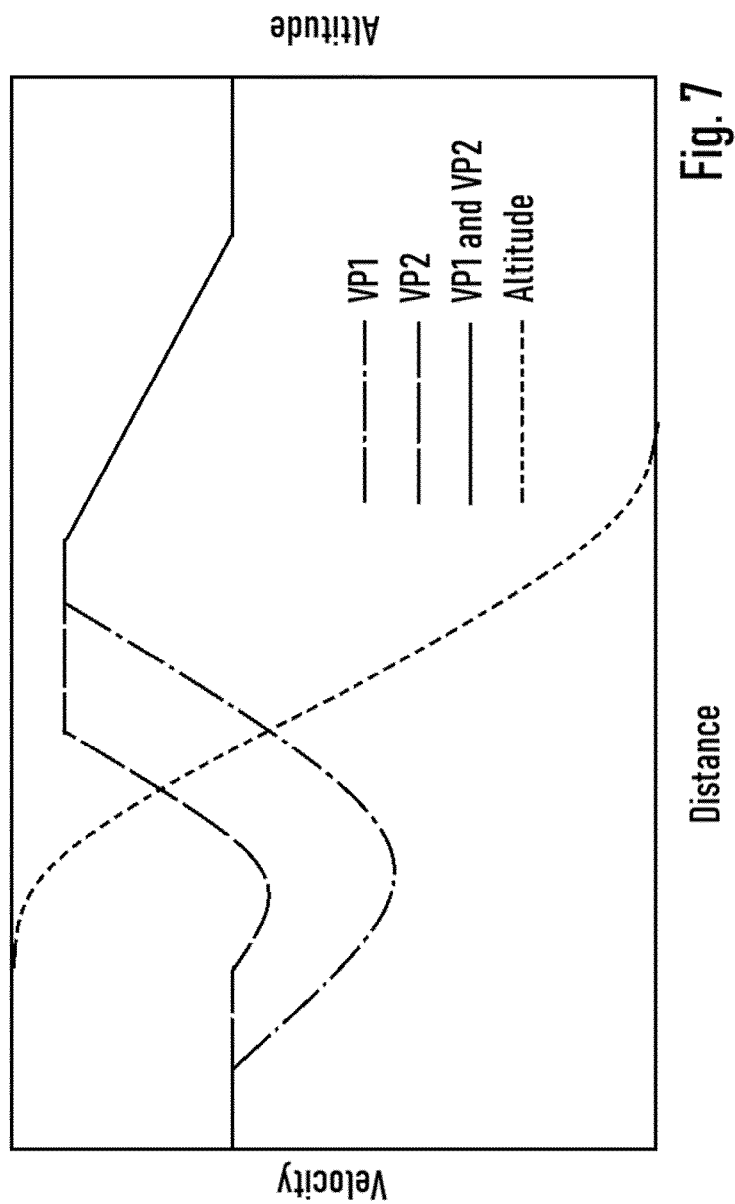

METHOD FOR CONTROLLING A VEHICLE

CROSS-REFERENCE TO RELATED APPLICATIONS

This application is a U.S. National Stage application of PCT/EP2019/086038, filed Dec. 18, 2019 and published on Jun. 24, 2021, as WO 2021/121583, all of which is hereby incorporated by reference in its entirety.

TECHNICAL FIELD

The invention relates to a method for controlling a vehicle, a computer program, a computer readable medium, and a control unit, or a group of control units.

The invention can be applied to heavy-duty vehicles, such as trucks and buses. Although the invention will be described with respect to trucks, the invention is not restricted to this particular type of vehicle, but may also be used in other vehicle types such as delivery vans and cars.

BACKGROUND

Increasing the productivity, while keeping operating costs as low as possible, is an aim of many vehicle operations, in particular commercial vehicle operations. The article "Look-ahead control for heavy trucks to minimize trip time and fuel consumption", Hellström, Ivarsson, Åslund and Nielsen, 2009, Control Engineering Practice, (Linköping University) discloses a drive mission for a heavy diesel truck. With aid of an onboard road slope database in combination with a GPS unit, information about the road geometry ahead is extracted. This look-ahead information is used in an optimization of the velocity profile with respect to a criterion formulation that weighs trip time and fuel consumption. A dynamic programming algorithm is devised and used in a predictive control scheme by constantly feeding the conventional cruise controller with new set points.

However, there is a desire to further improve the control of a vehicle to allow an increase of the productivity, while keeping operating costs as low as possible. In particular, there is a desire to provide a good balance between the productivity and the operating costs, in view of unexpected events during an operation of a vehicle along a route. An unexpected event could be for example a traffic jam. The traffic jam could be caused e.g. by an accident along the route.

SUMMARY

It is an object of the invention to increase the productivity of a vehicle, while keeping operating costs as low as possible. It is a particular object of the invention to avoid or reduce a decrease of the productivity of a vehicle travelling along a route, due to one or more unexpected events along the route, while keeping operating costs as low as possible.

The objects are reached with a method according to claim 1. Thus, the objects are reached with a method for controlling a vehicle travelling along a route, the method comprising
- obtaining a first value of a balance parameter, indicative of a balance between a cost for operating the vehicle along at least a part of the route, and a time of arrival at a position along the route,
- establishing, in dependence on the first balance parameter value, a plurality of desired position and time correlations for the travel of the vehicle along at least a part of the route,
- when the vehicle travels along the route, determining a progress deviation comprising a deviation, for a point in time, of an actual position of the vehicle from a desired position according to the desired position and time correlations, or a deviation, for a position of the vehicle, of an actual point in time from a desired point in time according to the desired position and time correlations,
- when the vehicle travels along the route, obtaining a second balance parameter value, different from the first balance parameter value, the second balance parameter value being dependent on the progress deviation, and
- controlling the vehicle in dependence on the second balance parameter value.

The first balance parameter is indicative of a balance between the vehicle operating cost along at least a part of the route, and a time of arrival at a position along the route. The operating cost could be a cost for operating the vehicle along the route, along a portion of the route, along a remainder of the route, or along a portion of the remainder of the route. The time of arrival at a position along the route, could be the time of arrival at the end of the route, or the time of arrival at a position before the end of the route.

Obtaining a first value of a balance parameter may be provided by determining the first balance parameter value. This determination may be done onboard the vehicle, or by a control unit located remotely from the vehicle. The first balance parameter value may be obtained before the vehicle starts travelling along the route. Alternatively, the first balance parameter value may be obtained while the vehicle travels along the route.

The plurality of desired position and time correlations is established for the travel of the vehicle along at least a part of the route, for example along the route, along a portion of the route, along a remainder of the route, or along a portion of the remainder of the route.

By establishing, in dependence on the first balance parameter value, a plurality of desired position and time correlations for the travel of the vehicle along the route, desired positions at respective points in time, or desired positions at respective points in time, may be provided. The desired position and time correlations may correlate each of a plurality of positions along the route to a respective point in time. The desired position and time correlations may be indicative of a desired progress of the vehicle along the route.

The progress deviation determination may involve determining an actual position and time correlation for the vehicle. The progress deviation may be indicative of a deviation of an actual position and time correlation of the vehicle from a desired position and time correlation according to the desired position and time correlations. The progress deviation determination may involve establishing a time correlated progress of the vehicle. The progress deviation determination provides for monitoring the progress of the vehicle.

The second balance parameter value may be indicative of a balance between a cost for operating the vehicle along at least a portion of the remainder of the route, and a time of arrival at a position along the route, e.g. at an end of the route. The second balance parameter value may provide a change of the balance parameter value in dependence on the progress deviation. Compared to the first balance parameter value, the second balance parameter value may be indicative of a different balance between the cost for operating the vehicle along the route, and the time of arrival. The second balance parameter value provides a way to reduce a deviation of the actual time of arrival from a desired time of arrival. The second balance parameter value may further provide for this deviation reduction while keeping the vehicle operating costs as low as possible during the remainder of the route, or a portion thereof.

The invention may provide a dynamically changed balance parameter value. As a result of the first balance parameter value followed by the second balance parameter value, an adjustment can be made in view of an unexpected event along the route. For example, if an unexpected event delays the vehicle, so as to delay the time of arrival, if the operating cost consideration is kept unchanged, the change of the balance parameter value, from the first balance parameter value to the second balance parameter value, could allow a more aggressive driving in order to reduce the expected delay at arrival. In addition, the second balance parameter value may be such that, given the desire to reduce the delay at arrival, the vehicle operating costs for the remainder of the route, or a part thereof, is kept as low as possible.

Thus, the invention provides a reduction of a deviation, of the actual time of arrival from a desired time of arrival, of the vehicle travelling, while keeping the cost for operating the vehicle along the route as low as possible. The reducing the arrival time deviation may provide an increase in the productivity of the vehicle. The invention allows avoiding or reducing a decrease of the productivity of the vehicle, due to one or more unexpected events along the route, while keeping operating costs as low as possible. This may be particularly advantageous in commercial vehicle operations.

The invention can be applied to any type of vehicle, e.g. a heavy-duty vehicle, such as a truck or a bus, or another type of vehicle, such as a delivery van or a car. The invention is applicable to a vehicle with any suitable type of drivetrain. For example, the drivetrain may include an internal combustion engine as the sole propulsive device, the drivetrain may be a hybrid drivetrain, or the drivetrain may include an electric motor as the sole propulsive device.

The operating cost may be dependent on one or more of fuel consumption, electrical energy consumption, battery degradation, another degradation of the vehicle, and driver/operator salary.

The vehicle may be an autonomous vehicle. In some embodiments, the vehicle may be driven by a human driver. In the latter case instructions for the control of the vehicle may be communicated to the driver, e.g. by means of a visual display, and/or with audio instructions.

Preferably, the method comprises determining, when the vehicle travels along the route, in dependence on the second balance parameter value, a velocity profile for the vehicle for at least a portion of the remainder of the route, and controlling the vehicle according to the determined velocity profile. Thereby, an optimal vehicle speed at positions along the remainder of the route, or a portion thereof, may be provided by the velocity profile, in dependence on the second balance parameter value. Thereby, an optimal tradeoff between the vehicle operating cost the time of arrival, may be provided.

The velocity profile may be propagated to one or more vehicle control functions. The vehicle control functions may use the velocity profile as a speed reference. The velocity profile may be calculated by means of a cost function. The second balance parameter value may be a weight factor in the cost function. The velocity profile may be computed using dynamic programming. However, other computational techniques may be used for the velocity profile.

Preferably, the method comprises obtaining a vehicle model in the form of a mathematical model for the vehicle, wherein the velocity profile is determined by means of the vehicle model. Thereby, an accurate speed profile may be provided. The establishment of a plurality of desired position and time correlations may be done by means of the vehicle model.

Preferably, the method comprises obtaining data for the route, and determining, in dependence on the second balance parameter value, a velocity profile for the vehicle for at least a portion of the remainder of the route, wherein the velocity profile is determined in dependence on the route data. Thereby, an accurate speed profile may be provided. The route data may include inclination data, curvature data, and/or speed limit data. The establishment of a plurality of desired position and time correlations may be done by means of the route data. In particular, the establishment of a plurality of desired position and time correlations may be done by means of the route data, the vehicle model, and the balance parameter value.

Preferably, the velocity profile is a second velocity profile, the method further comprising, determining, in dependence on the first balance parameter value, a first velocity profile for the vehicle for at least a part of the route, and controlling the vehicle according to the first velocity profile, wherein the second velocity profile replaces the first velocity profile for the control of the vehicle.

The first velocity profile may be determined for the route, a portion of the route, a remainder of the route, or a portion of the remainder of the route. The first velocity profile may be established when travelling along the route or before travelling along the route. This second velocity profile may be different from the first velocity profile. The method may comprise determining, in dependence on the established desired position and time correlations, a draft velocity profile, and controlling the vehicle according to the draft velocity profile, wherein the second velocity profile replaces the draft velocity profile for the control of the vehicle. The draft velocity profile may be determined before travelling along the route. The draft velocity profile may be the same as what is herein referred to as a first velocity profile. The velocity profile replacement may secure a reduction of an arrival time deviation, e.g. in view of an unexpected event.

Preferably, the method comprises establishing, in dependence on the second balance parameter value, a plurality of desired position and time correlations for the travel of the vehicle along at least a portion of the remainder of the route. Thereby, a further progress deviation may be determined in dependence on the desired position and time correlations, established in dependence on the second balance parameter value. Thereby, the second balance parameter value may be repeated, as suggested below.

Preferably, the method comprises determining a plurality of balance parameter values, each for a respective progress deviation. Thereby, a plurality of balance parameter values may be determined for respective progress deviations. The progress deviations may be predetermined. The progress deviations and the balance parameter values may be stored before the vehicle start travelling on the route. The progress deviations may indicate respective positions along the route, and points in time for the vehicle travel. The progress deviations and the balance parameter values may be stored in a control unit remote from the vehicle. Thereby, a bank of predetermined balance parameter values, for respective progress deviations, may be provided. Upon an actual progress deviation being established, the progress deviation may be mapped to a predetermined balance parameter value. This may reduce the computational requirements for establishing the balance parameter value, once the actual progress deviation has been established. The predetermined balance parameter values may be stepped. This will reduce the data amount in the method.

Alternatively, a balance parameter value may be calculated upon an establishment of an actual progress deviation.

The method may comprise repeating a plurality of times, as the vehicle travels along the route, determining a progress deviation, obtaining a second balance parameter value dependent on the progress deviation, and controlling the vehicle in dependence on the second balance parameter value. Obtaining the balance parameter value may be repeated within predetermined time intervals. The method may comprise repeating a plurality of times a determination, in dependence on the second balance parameter value, of a velocity profile for the vehicle for at least a portion of the remainder of the route, wherein the second balance parameter value, obtained in a repeated step of obtaining a second balance parameter value, replaces, for the velocity profile determination, the second balance parameter value obtained in a previous step of obtaining a second balance parameter value. Determining the velocity profile may be repeated within predetermined time intervals.

Thereby, a velocity profile may be determined, in dependence on the most recently obtained second balance parameter value, and the vehicle may be controlled according to the determined velocity profile. Thus, a series of balance parameter values may be obtained, as the vehicle travels along the route. In embodiments of the invention, what is herein referred to as a first balance parameter value, may be followed by a series of second balance parameter values. The balance parameter values may also be referred to as first, second, third, fourth balance parameter values, etc. The method may comprise establishing, in dependence on the second balance parameter value, a plurality of desired position and time correlations for the travel of the vehicle along the at least a portion of the remainder of the route. Additional pluralities of desired position and time correlations may be established in dependence on further respective balance parameter values. Further, a series of velocity profiles may be determined, each with the most recently obtained balance parameter value. Thus, as the vehicle travels along the route, the velocity profile may be repetitively updated in dependence of updated progress deviations.

In some embodiments, the velocity profile determination is repeated more often than the step of obtaining a second balance parameter value. For example, the velocity profile may be repetitively updated within intervals of 5 seconds-5 minutes. As a further example, the balance parameter value may be repetitively updated within intervals of 1-60 minutes.

Preferably, the method comprises repeating establishing, in dependence on the second balance parameter value, a plurality of desired position and time correlations for the travel of the vehicle along at least a portion of the remainder of the route. Thereby, a series of pluralities of desired position and time correlations may be established. Thereby, each of the repeated progress deviation determinations may be dependent on a respective of the pluralities of desired position and time correlations. Thereby, each of further second balance parameter values may be dependent on a respective progress deviation, in turn dependent on a respective of the pluralities of desired position and time correlations.

The trip that the vehicle performs, when travelling along the route, may be referred to as a present trip along the route. Preferably, the method comprises performing, a plurality of times, a previous trip along the route, or along a virtual reality route in the form of a virtual reality representation of the route, wherein the second balance parameter value is determined in dependence on the previous trips. The previous trips may be performed before the vehicle starts the present trip.

For example, at least some of the previous trips may be simulated. Thus, the method may comprise providing a virtual reality route in the form of a virtual reality representation of the route, and simulating, a plurality of times, the travel of a vehicle along the virtual reality route, wherein the second balance parameter value is determined in dependence on the simulations. The vehicle of the simulations may be a representation of a vehicle which is the same as, or similar to, the vehicle performing the present trip, e.g. having the same, or a similar, type of drivetrain, and/or substantially the same load.

At least some of the previous trips may be real trips of a vehicle along the route. Thereby, at least some of the previous trips may be productive trips, e.g. by involving the transport of goods and/or people. The real previous trips may all be performed by a single vehicle, or one or some of the real previous trips may be performed by one or more vehicles which are different from the vehicles performing the other real previous trips. Preferably, the vehicle(s) performing the real previous trips is/are of the same type as the vehicle performing the present trip, or the same vehicle. Preferably, the vehicle(s) performing the real previous trips has/have substantially the same load as the vehicle performing the present trip.

Similar to the present trip, the previous trips may involve obtaining a first balance parameter value, determining a progress deviation, obtaining a second balance parameter value dependent on the progress deviation, and controlling the vehicle in dependence on the second balance parameter value.

Thereby, the method may comprise determining, for each previous trip, a value of a reward parameter, in dependence of a deviation of an actual time of arrival at the end of the previous trip, from a desired time of arrival. Preferably, the second balance parameter value is determined in dependence on an outcome of a machine learning process at a remainder of the previous trips, in dependence on the reward parameter values determined for respective earlier previous trips.

The previous trips are preferably performed before the vehicle starts the present trip. Thereby, a control unit determining the balance parameter values may be "pre-trained" by the machine learning process. Where a previous trip is a simulations, the simulation may expose the control unit to a plurality of different driving situations. The simulations may include virtual objects along the virtual route. The machine learning at the simulations may be similar to that of autonomous vehicle perception training.

In addition to the deviation of an actual time of arrival at the end of the previous trip, from the desired time of arrival, the reward parameter value may be determined in dependence on the operating cost for the vehicle. The reward parameter be may be defined in any suitable way. The reward parameter value may indicate how well the vehicle has performed in terms of arrival time deviation and operating cost. The reward parameter may present high values for "good" results, and low values for "bad" results. Of course, the reward parameter may also be provided in the form of a penalty parameter, presenting high values for "bad" results, and low values for "good" results. From a penalty parameter value, a reward can be indicated as a negative value of the penalty parameter value, and vice versa.

The reward parameter may have two parts, one related to the arrival time deviation, and another related to the operation cost. The arrival time deviation part may make a contribution to the reward parameter value, which is higher at a relatively small arrival time deviation, than at a relatively large arrival time deviation. The arrival time deviation part may provide a time corridor around the desired arrival time, within which corridor the contribution to the reward parameter value is relatively high, and outside of which corridor, the parameter value is relatively low. Thereby, a stepwise penalty may be provided, e.g. where an arrival time deviation result, above a certain value, in a significant productivity loss, e.g. due to a ferry departure being missed.

The reward parameter may give a grade for all actions of the vehicle along the route. Preferably, a large amount of previous trips are performed, e.g. by simulations. For example, at least 100, or at least 1000, previous trips may be performed, wherein a reward parameter value is determined for each trip. Thereby, through machine learning, a control unit may correlate "good" reward parameter values to certain balance parameter values in certain driving situations. Thereby, the control unit may learn to provide a well-selected balance parameter value, even if the reward parameter does not give a grade for individual actions of the vehicle within the previous trips.

In some embodiments, the method comprises determining an anticipated traffic situation along the route, and determining the second balance parameter value in dependence on the anticipated traffic situation. This may improve the balance parameter determination. The anticipated traffic situations, for example a rush hour traffic condition along a part of the route between two given points in time, may be taken into account for the balance parameter value determination. The anticipation of the traffic situation may be in existence due to the experience from one or more previous trips along the route.

Where a velocity profile is determined, in dependence on the second balance parameter value, for the vehicle for at least a portion of the remainder of the route, the velocity profile is preferably determined on-board the vehicle. Thereby, data available in the vehicle, such as operational conditions, is easily accessible for a control unit, in the vehicle, using the data for the velocity profile determination.

In some embodiments, the second balance parameter value is determined by a control unit located remotely from the vehicle. Thereby, the balance parameter value may be used also by other vehicles travelling along the route. Where, as suggested above, a bank of predetermined balance parameter values, for respective progress deviations, is provided, the storing of these balance parameter values by the central control unit, allows for the values to be used by a plurality of vehicles travelling along the route. This may reduce the computational requirements for the individual trips along the route.

Where the method comprises determining, in dependence on the second balance parameter value, a velocity profile for the vehicle for at least a portion of the remainder of the route, preferably the velocity profile determination comprises establishing a sequence of velocity profile positions along the remainder of the route, or the portion of the remainder of the route. Preferably, the method further comprises associating with each of a plurality of, preferably all of, the velocity profile positions a respective altitude of the position, and/or a respective road inclination at the position. This may be done for example as described in PCT/EP2019/067049, incorporated herein by reference. Thereby, the altitudes of the velocity profile positions, or road inclinations at the velocity profile positions may be obtained from route data, mentioned above.

Determining the velocity profile may comprise setting up a matrix for the remainder of the route, or the portion of the remainder of the route, with the sequence of velocity profile positions, and one or more vehicle velocity values for each velocity profile position. Preferably there are a plurality of velocity values for each of a plurality of, or all or, the route positions. A plurality of velocity values for a route position may be discrete, i.e. stepped. The velocity values in the matrix are herein also referred to as velocity nodes. The matrix may be limited by vehicle velocity limits.

Preferably the method comprises determining, for a pair of adjacent velocity profile positions in the sequence of velocity profile positions, a vehicle velocity at one of the positions, and determining a plurality of candidate velocity changes, each providing a respective vehicle velocity at the other of the positions. Each candidate velocity change may represent a move from one velocity node to another velocity node, in the matrix exemplified above.

The method may comprise determining, for each of a plurality of, or all of, the candidate velocity changes, a candidate cost. Each candidate cost may be dependent on the cost of operating the vehicle between the adjacent velocity profile positions. Each operating cost may be based partly on the road inclination at the respective pair of adjacent velocity profile positions, and the distance between the adjacent velocity profile positions. Said distance is herein also referred to as a segment of the route. Each operating cost may further be based partly on the vehicle velocity, of the respective candidate velocity change, at one of the velocity profile positions, the vehicle velocity, of the respective candidate velocity change, at the other of the positions.

Each candidate cost may also be dependent on the time of driving between the adjacent velocity profile positions. This may be done by adjusting the candidate costs, based at least partly on the time of driving between the adjacent velocity profile positions. The adjustment can be done by a weighting function, balancing the cost of operating the vehicle when travelling between the adjacent velocity profile positions, with the duration of travelling between the adjacent positions. The weighting function may be a function of the operating cost, the duration, and the second balance parameter value. The balance of the operating cost and the duration may be adjusted by means of the second balance parameter value.

Thus, each candidate cost may be dependent on the cost of operating the vehicle between the adjacent velocity profile positions, the time of driving between the adjacent velocity profile positions, and the second balance parameter value.

In some embodiments, the weighting function increases in value with an increasing operating cost, and the weighting function increases in value also with an increasing duration of travelling between the adjacent positions. Thereby, the velocity profile may be determined such that the velocity profile minimizes the weighting function. Thereby, an effective way of balancing vehicle operation costs with the vehicle productivity, i.e. the vehicle transport duration, may be provided.

The method may comprise determining the velocity profile, for the remainder of the route, or the portion thereof, by selecting, for each pair of adjacent positions, one of the candidate costs, such that the sum of the candidate costs, selected throughout the remainder of the route, or the portion thereof, are minimized. Thereby, example situation costs, calculated before the route is known, may be used, as described in said PCT/EP2019/067049, incorporated herein by reference, so as for the computational capacity needed for the determination of the velocity profile, will be considerably lower than in a case where the costs are calculated, e.g. from a vehicle model.

The objects are also reached with a computer program, a computer readable medium, or a control unit, or a group of control units.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 4 shows a contour of a portion of the route to be travelled by the vehicle.

FIG. 7 is a diagram showing two velocity profiles at a downhill portion of a route.

DETAILED DESCRIPTION OF EXAMPLE EMBODIMENTS OF THE INVENTION

Figure 1:
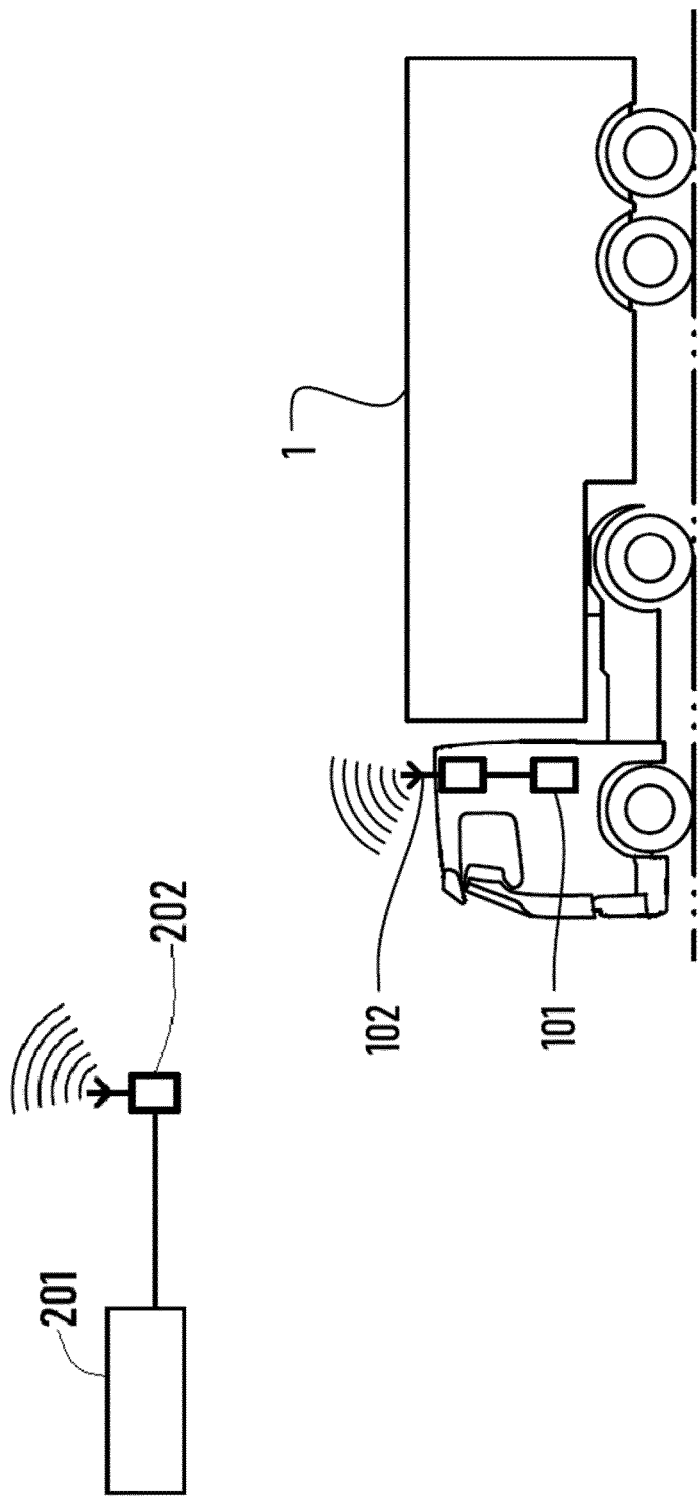
FIG. 1 is a schematic view of a vehicle and a stationary control unit.

FIG. 1 shows a vehicle 1. In this example, the vehicle 1 is a truck with a semitrailer. However, the invention is equally applicable to other types of vehicles, such as cars, buses, dump trucks, and mining vehicles.

The vehicle includes a powertrain. The powertrain includes a propulsion arrangement. Embodiments of the invention are applicable to a variety of propulsion arrangements. The propulsion arrangement may include an internal combustion engine. The vehicle may be arranged to be driven by an engine only. The propulsion arrangement may include an electric motor. The propulsion arrangement may be a hybrid arrangement with an engine and a motor.

The vehicle comprises a vehicle control unit 101, arrange to control functions of the vehicle, such as its propulsion, and braking. The control unit is arranged to control the propulsion arrangement. The control unit is arranged to control a braking system of the vehicle. The vehicle control unit 101 may be provided as a single physical unit, or as a plurality of physical units, arranged to communicate with each other.

The vehicle also comprises vehicle equipment for wireless communication 102. The vehicle control unit 101 is arranged to receive data via the vehicle communication equipment 102.

FIG. 1 also shows a stationary control unit 201. The stationary control unit 201 may be located remotely from the vehicle. The stationary control unit 201 may be provided as a computer. The stationary control unit 201 is connected to stationary equipment for wireless communication 202. The stationary control unit 201 is arranged to send data via the stationary communication equipment 202.

Figure 2:
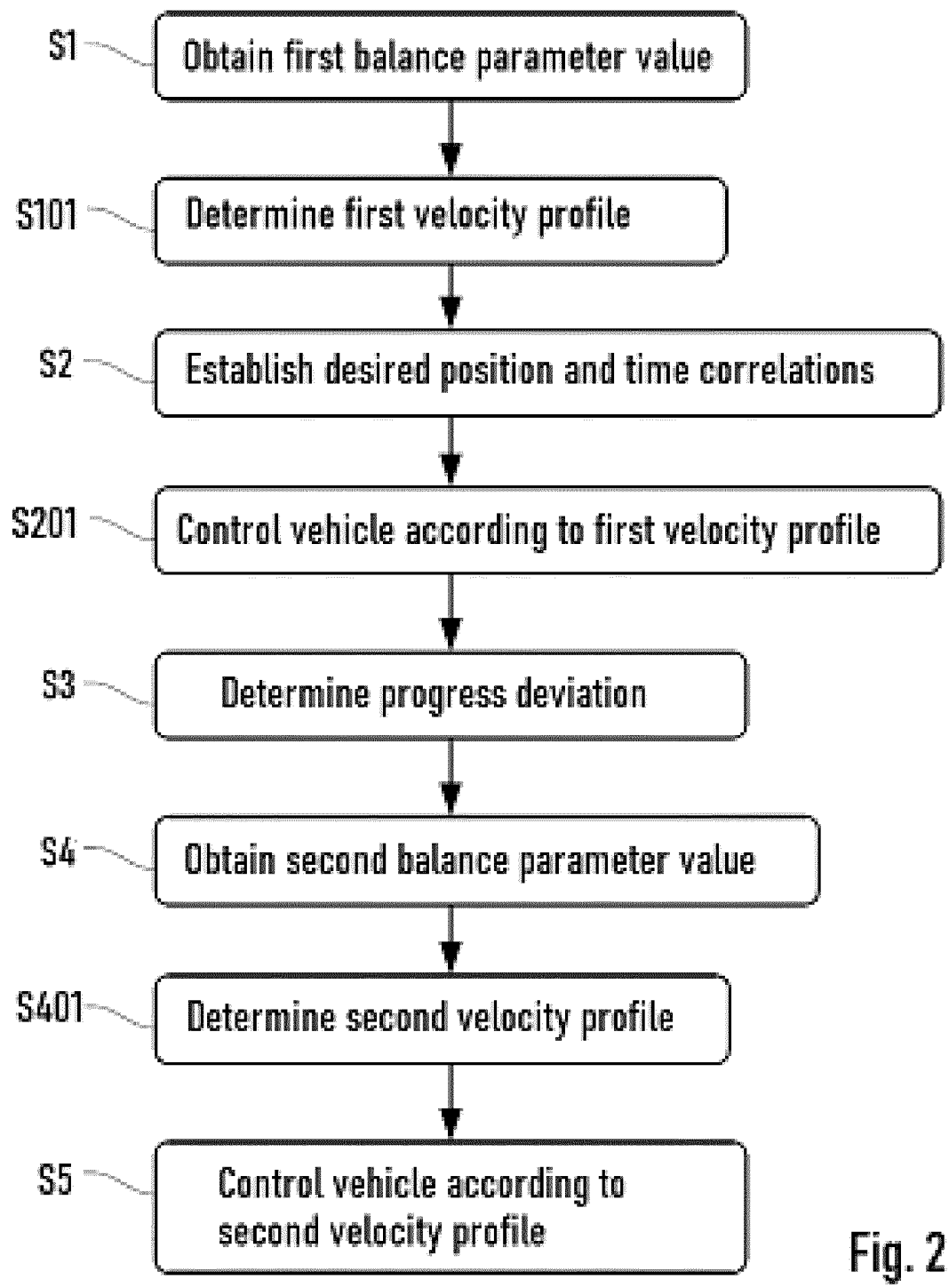
FIG. 2 is a diagram depicting steps in a method, according to an embodiment of the invention, for controlling the vehicle in FIG. 1 along a route.

With reference to FIG. 2, a method according to an embodiment of the invention will be described. The method is provided for controlling the vehicle when travelling along a route. The route can be of any length, e.g. 5, 50, or 500 km. For a commercial vehicle, a trip along the route can be for transporting goods and/or persons, from one location to another location.

The method comprises obtaining S1 a first value of a balance parameter, indicative of a balance between a cost for operating the vehicle along the route, and a time of arrival at an end of the route.

Figure 3A:
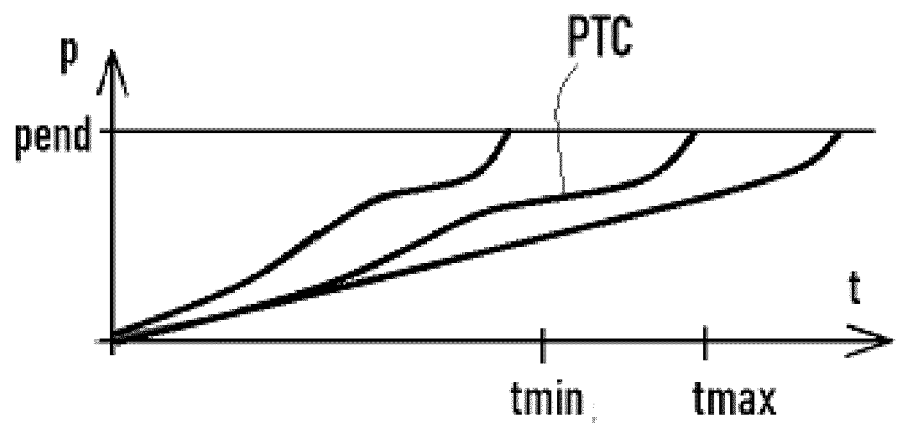
FIG. 3a and FIG. 3b show diagrams of vehicle progresses along the route, as functions of time.

Reference is also made to FIG. 3a. In dependence on the first balance parameter value, a first velocity profile for the vehicle for the route is determined S101. The method further comprises establishing S2, in dependence on the first balance parameter value, a plurality of desired position and time correlations PTC for the travel of the vehicle along the route. The desired position and time correlations PTC may be provided based on the first velocity profile. The first velocity profile may also be referred to as a draft velocity profile. The first velocity profile may be determined while the vehicle is stationary, e.g. before the travel along the route starts.

The first velocity profile provides a draft velocity as a function of positions along the route. As suggested by equation (1) below, a function fd may define how the draft velocity vdr $v_{dr}$, at a position p, depends on a maximum speed vmax(p), the road inclination α(p) and the first balance parameter value wdr.

$$v_{dr}(p) = fd(v_{max}(p), \alpha(p), w_{dr}) \quad (1)$$

As depicted in FIG. 3a, there is in this example an allowed time of arrival of the vehicle, at the end of the route, which arrival time is between tmin and tmax. The first balance parameter is dependent on the cost for operating the vehicle along the route. It may be assumed that a relatively low velocity will, compared to a relatively high velocity, reduce the operating cost. Of course, the lower the velocity is, the longer time it takes to reach the end of the route. It is thereby understood that the first balance parameter value is optimally determined as a value that provides the first velocity profile as resulting in the vehicle reaching the end of the route pend at the latest allowed point in time tmax.

As the vehicle starts travelling along the route, the vehicle is controlled S201 according to the first velocity profile.

Figure 3B:
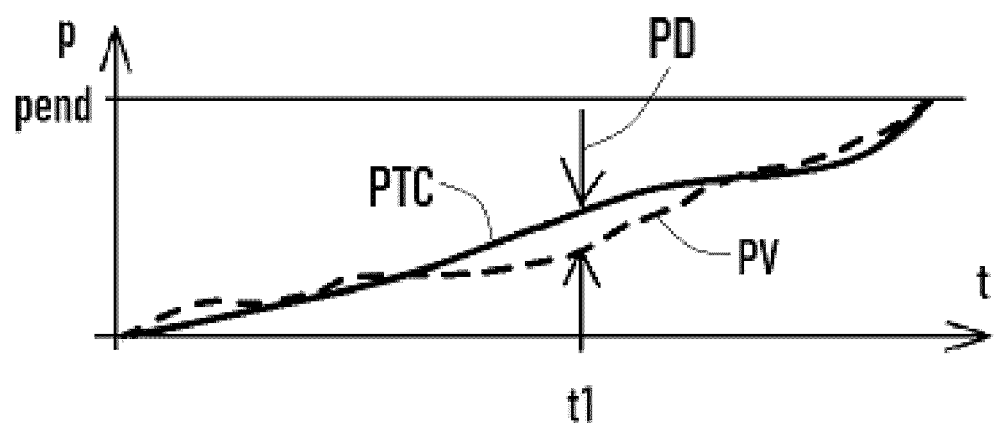

Reference is made also to FIG. 3b. When the vehicle travels along the route, a progress deviation PD is determined S3. The progress deviation PD comprises a deviation, for a point in time, of an actual position of the vehicle PV from a desired position according to the desired position and time correlations PTC. Of course, alternatively, the progress deviation PD may comprise a deviation, for a position of the vehicle, of an actual point in time from a desired point in time according to the desired position and time correlations. In the example in FIG. 3b, the progress deviation PD is determined at a point in time t1. Thereby, the progress deviation PD is such that the actual position PV of the vehicle is behind the desired position PTC.

Upon determining the progress deviation PD, a second balance parameter value, different from the first balance parameter value wdr, is obtained S4. The second balance parameter value is dependent on the progress deviation PD. In this example, the second balance parameter value is determined by the stationary control unit 201. For the determination, the progress deviation PD may be sent from the vehicle to the stational control unit. When the second balance parameter value is determined, it may be obtained by the vehicle by the stationary control unit sending it to the vehicle.

In this example, the progress deviation PD is normalized against the length of the route. A negative progress deviation may be defined as a progress deviation in which the actual progress PV of the vehicle is less than the desired progress PTC.

The second balance parameter value is dependent on the progress deviation PD.

As exemplified below, a second velocity profile is provided, and the determination of the second velocity profile involves a weighting function. The weighting function may be a function of the operating cost, the duration of the travel, and the second balance parameter value. The balance of the operating cost and the duration may be adjusted by means of the second balance parameter value.

For example, the weighting function can be $$CT = (1 - wstc1) * Coper + wstc1 * t \qquad (2)$$

where CT is a total cost, Coper is the operating cost, t is the time for travelling, and wstc1 is the second balance parameter value. In this example, the second balance parameter value wstc1 is in the interval 0 to 1. As exemplified below, the second velocity profile may be determined with an aim to minimize the weighting function, in the example above, the total cost CT.

In this example, the more negative the progress deviation PD is, the larger the second balance parameter value wstc1 will be. This will allow a relatively high operating cost, and it will require a relatively short time for travelling along the route, or the remainder of the route.

It should be noted that, as described above, the method may comprise determining an anticipated traffic situation along the route, and determining the second balance parameter value in dependence on the anticipated traffic situation.

As suggested, the method comprises determining S401, in dependence on the second balance parameter value wstc1, a second velocity profile for the vehicle for a portion RT of the remainder of the route. Thereby, the second velocity profile replaces the draft velocity profile for the control of the vehicle. The second velocity profile is determined by means of the vehicle model.

The vehicle model may include a model of the powertrain. The model may include energy losses of the powertrain. The vehicle model may include a model of the propulsion arrangement. Where the propulsion arrangement includes an internal combustion engine, the model may include the engine, and allow the determination of the fuel consumption. Where the propulsion arrangement is an electric hybrid propulsion arrangement, or a fully electric propulsion arrangement, the vehicle model may include a model of the electric motor, and a model of an electric storage device, such as a battery, or a battery pack. The electric storage device model may include a model of the state of health of the storage device. The electric storage device model may include a battery degradation model. The storage device capability may be dependent on a state of charge of the storage device The vehicle model may further include a model of a braking system of the vehicle. The braking system may include service brakes. The braking system may include a function of regenerative braking by means of the motor and the storage device. Further, the vehicle model may include a model of a road friction. The method may aim to minimize the use of the service brakes.

Reference is made also to FIG. 4. For the velocity profile, data for the route portion RT, herein also referred to as route data, is obtained. Thereby, the velocity profile VP2 is determined in dependence on the route data. The route data comprises topology data, indicative of a topology of the route portion RT. The topology data may be obtained from map data.

The velocity profile determination comprises establishing a sequence of velocity profile positions P0-P9 along the portion RT of the remainder of the route. The stretch of the route between two adjacent velocity profile positions is herein referred to as a segment ST1-ST9. The segments may be of different length, or of equal length. It should be noted that the number of positions in FIG. 3 is, for simplicity of this presentation, considerably lower, than it may be in a practical embodiment of the invention. For example, the length of the segments may be 10 meters.

In dependence on the topology data, an altitude ALT is associated with each position P0-P9. In this example, the road inclination of each segment ST1-ST9 is assumed to be constant. As exemplified in FIG. 4, the road inclination a of a segment ST4 can be determined by the altitudes of the positions P3, P4 at the ends of the segment ST4, and the length of the segment.

Figure 5:
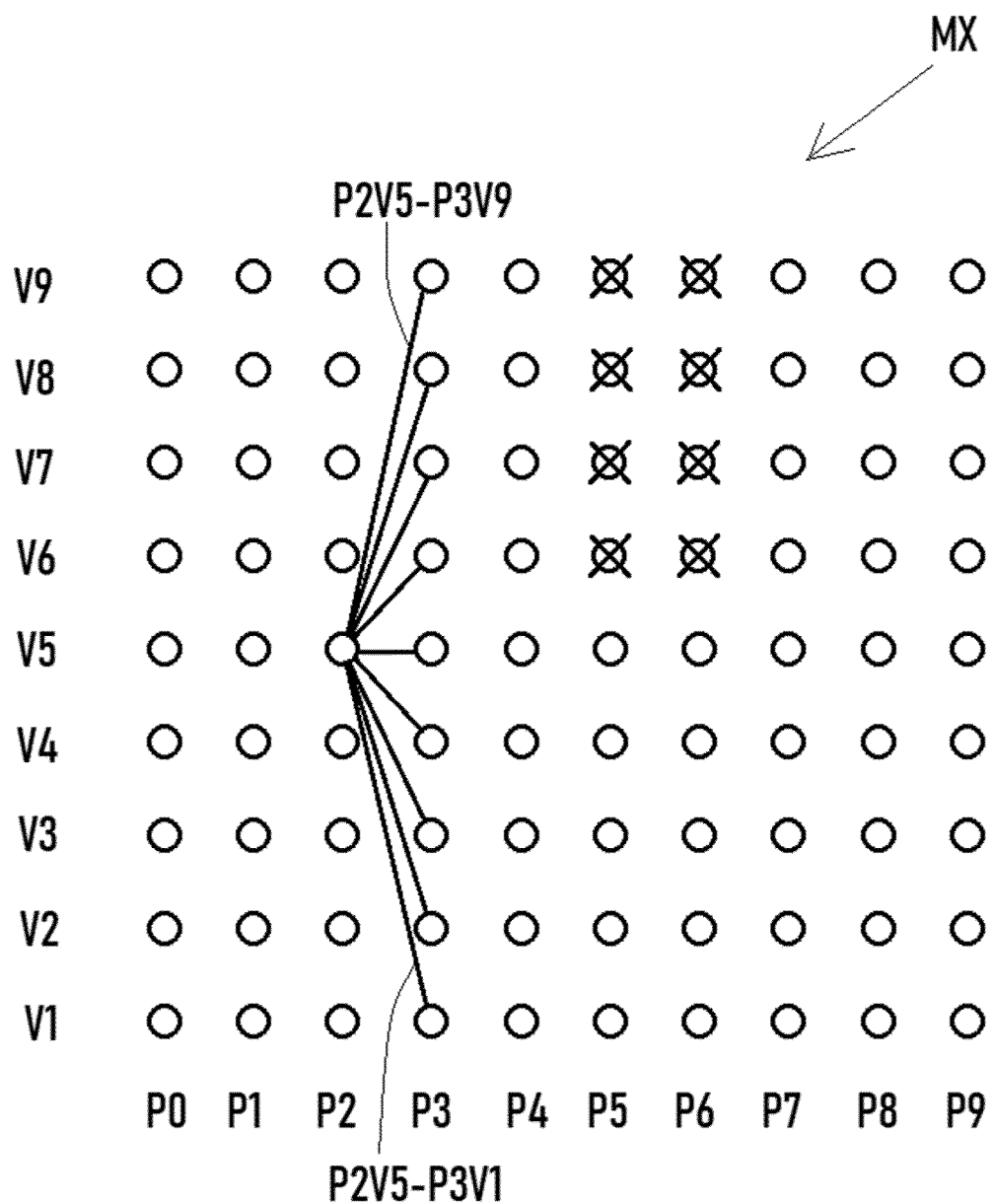
FIG. 5 and FIG. 6 depict a matrix for determining a velocity profile of the vehicle.

Reference is made also to FIG. 5. Determining the velocity profile may comprise setting up a matrix MX for the route portion RT. The matrix includes the sequence of route positions P0-P9. For each position, a plurality of vehicle velocity values V1-V9 are provided. It should be noted that the number of positions and velocities in the matrix in FIG. 5 is, for simplicity of this presentation, considerably lower, than it could be in a practical embodiment of the invention. The velocity values are indicated in FIG. 5 with circles. A pair of a position and a velocity, in the matrix, is herein also referred to as a node. The velocity values are, for each position, stepped, discrete values.

Consideration may be made for velocity limits, for example imposed by road curves, or legal speed limits. For this, some velocity values may be removed in the matrix MX. This is exemplified in FIG. 5 by removing the nodes of some velocities V6-V9 at some of the positions P5, P6. Also, lower velocity limits may be taken into consideration for the matrix.

The velocity profile determination may further comprise determining, for a pair of adjacent positions P2, P3 in the sequence of velocity profile positions, a vehicle velocity V5 at one of the positions P2, and determining a plurality of candidate velocity changes P2V5-P3V1, . . . , each providing a respecting vehicle velocity V1-V9 at the other of the velocity profile positions P3. The candidate velocity changes are in the example in FIG. 5 indicated with lines between the nodes in question. The candidate predicted velocity changes in this example are designated P2V5-P3V1, P2V5-P3V2, P2V5-P3V3, etc.

Non-feasible candidate velocity changes may be identified. For example, certain velocity changes might not be possible within the length of the segment between the positions P2, P3, for example, due to a limitation of the road friction, a capacity limitation of the powertrain, and/or a capacity limitation of the brake system.

The velocity profile determination may further comprise determining, for each a plurality of, or all of, the candidate velocity changes P2V5-P3V1, . . . , a candidate cost CC.

Each candidate cost may be dependent on the cost of operating the vehicle between the adjacent velocity profile positions, the time of driving between the adjacent velocity profile positions, and the second balance parameter value $wstc1$.

As suggested, in this embodiment, the second velocity profile is determined such that a weighting function, dependent on the cost of operating the vehicle when travelling through the route portion, and the duration of the vehicle travelling through the route portion is optimized, e.g. minimized. The weighting function may be provided in any suitable way. The weighting function provides a balance between operating costs and the cost of time, which is an indication of the productivity of the vehicle.

For the operation cost and productivity balance, the candidate costs, may be adjusted, based at least partly on the time of driving between the adjacent positions P2, P3. For example, the weighting function can be $$CCadj=(1-wstc1)*CC/CCopernom+wstc1*\Delta t/\Delta tnom \qquad (3)$$

where $CCadj$ is the adjusted candidate cost, $CC$ is the non-adjusted candidate cost, i.e. the operating cost for the candidate velocity change, $CCopernom$ is a reference operating cost to normalize the operating cost $CC$, $\Delta t$ is the time for travelling between the positions P2, P3, $\Delta tnom$ is a reference time to normalize the time $\Delta t$, and $wstc1$ is the second balance parameter value. The second balance parameter value $wstc1$ may be in the interval 0 to 1.

An alternative for the weighting function may be:

$$CCadj=(1-wstc1)*(CC1/CC1nom+CC2/CC2nom)+ wstc1*\Delta t/\Delta tnom \qquad (4)$$

where $CC1$ is a first type of operating cost, e.g. the cost of energy usage, and $CC2$ is a second type of operating cost, for example a cost of wear, e.g. a state of health cost.

Equations (3) and (4) make the cost and time dimensionless. A more general weighting function could be:

In addition to the adjustments of the candidate predicted situation costs, the velocity profile for the route portion RT is determined by selecting, for each pair of adjacent positions P2, P3, one of the candidate costs, such that the sum of the candidate costs, selected throughout the route portion, are minimized. This optimization may be done by a shortest path algorithm, for example a Bellman-Ford algorithm. For this, one of the velocities at the last position P9 of the route portion, has to be selected. Since the velocity at the beginning of the path, may be known as the present velocity of the vehicle, end values for the shortest path algorithm are therefore available. The velocity at the last position P9 may be selected in any suitable manner, e.g. as being equal to a legal speed limit at the end position P9.

It should be noted that the adjustments of the candidate costs may be done simultaneously with the selection, throughout the route portion, of the candidate costs, for the minimization of the sum of the candidate costs. However, in some embodiments, when the time balanced candidate costs have been obtained for all feasible candidate velocity changes in the matrix MX, the velocity profile for the route portion RT is determined by selecting, for each pair of adjacent positions P2, P3, one of the candidate costs, such that the sum of the candidate costs, selected throughout the route portion, are minimized.

The optimization may be done in a stepwise manner. As an alternative to the shortest path algorithm, the velocity at a present position P0 (FIG. 4) of the vehicle 1 may be used as a start node in the matrix MX. Thereby, the lowest adjusted candidate cost, for travelling between the first two adjacent positions P0, P1, may be determined as exemplified above. The candidate velocity change of the lowest adjusted candidate cost will give a velocity at the next position P1. The process for determining the lowest adjusted candidate cost is then repeated for the next pair of adjacent positions P1, P2.

Figure 6:
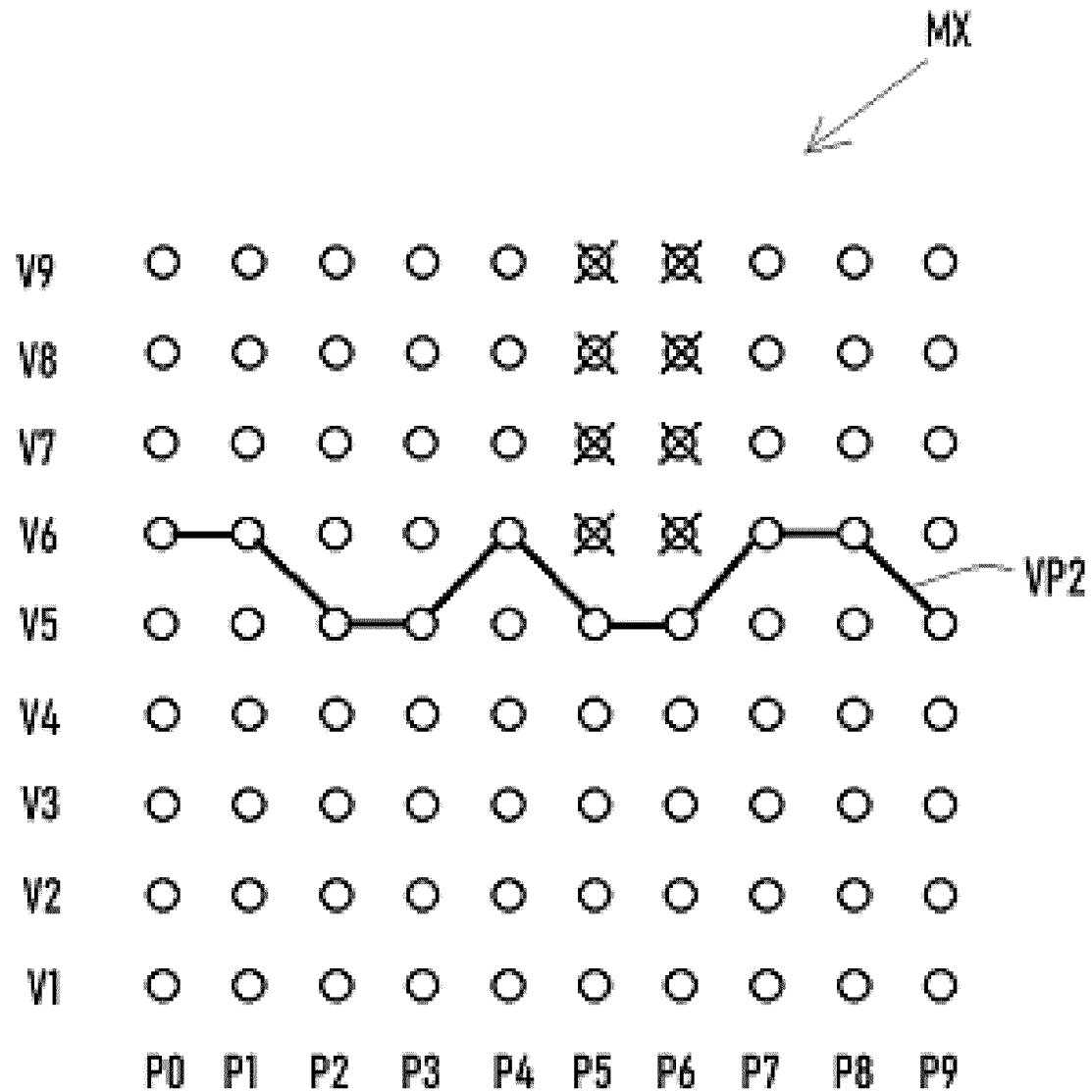

The result of the optimization will be a series of selected candidate velocity changes, which together form the determined velocity profile VP2, as exemplified in FIG. 6.

The method further comprises establishing, in dependence on the second balance parameter value, a plurality of desired position and time correlations for the travel of the vehicle along the remainder of the route. The desired position and time correlations may be provided based on the second velocity profile.

The method in this embodiment further comprises controlling S5 the vehicle according to the determined second velocity profile VP2. Thereby, the vehicle is controlled in dependence on the second balance parameter value $wstc1$. The second velocity profile replaces the first velocity profile for the control of the vehicle.

Reference is made also to FIG. 7. FIG. 7 shows an example of the first velocity profile VP1, and the second velocity profile VP2, in a downhill portion of the route. The first velocity profile VP1 is the result of the use of a weighting function, $CT=(1-wdr1)*Coper+wdr1*t$, similar to the weighting function (2) above, with a relatively low first balance parameter value $wdr$. The second velocity profile VP2 is the result of the use of the weighting function (2) above, with a relatively high second balance parameter value $wstc1$. In both velocity profiles, the velocity is lowered before the downhill portion is reached, to increase the transformation of potential energy into kinetic energy, thereby reducing the operating costs. However, in the second velocity profile, compared to the first velocity profile, the velocity is less reduced before the downhill portion. This is a result of the increased weight of the time part of the weighting function.

In this embodiment, the method comprises repeating a plurality of times, as the vehicle travels along the route, determining a progress deviation PD, and obtaining a second balance parameter value dependent on the progress deviation. Further the method comprises repeating a plurality of times, determining, in dependence on the second balance parameter value, of a velocity profile for the vehicle for at least a portion of the remainder of the route. In this embodiment, the velocity profile determination is repeated more often than the step of obtaining a second balance parameter value. The velocity profile determination may be done at regular time intervals, or driving distance intervals, e.g. every 100 metres.

Figure 8A:
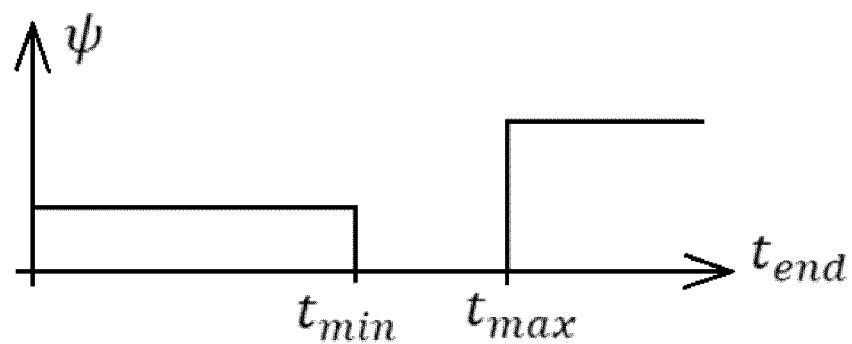
FIG. 8a and FIG. 8b show diagrams of a penalty parameter, as a function of time, to be used in a machine learning process for determining predetermined balance parameter values.
Figure 8B:
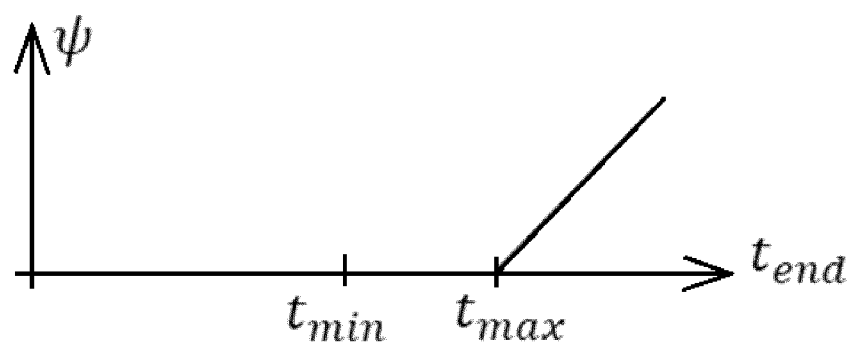

Reference is made also to FIG. 8a and FIG. 8b. The vehicle performs, when travelling along the route, what is herein referred to as a present trip along the route. In this embodiment, a bank of predetermined balance parameter values, for respective progress deviations, is provided in advance, to reduce the computational requirements in the present trip for establishing a balance parameter value, once a progress deviation has been established. Upon an actual progress deviation being established, the progress deviation may be mapped to a predetermined balance parameter value.

For providing this bank of predetermined balance parameter values, the method comprises determining a plurality of balance parameter values, each for a respective progress deviation PD. The progress deviations and the balance parameter values may be stored, e.g. in the stationary control unit 201, before the vehicle start travelling on the route.

In this embodiment, for providing the bank of predetermined balance parameter values, the method comprising performing, a plurality of times, a previous trip along the route, or along a virtual reality route in the form of a virtual reality representation of the route. Thereby, in dependence on the previous trips, a plurality of balance parameter values are determined, for respective progress deviations.

As depicted in FIG. 8a and FIG. 8b, providing the balance parameter value bank comprises determining, for each previous trip, a value of a reward parameter, in dependence of a deviation of an actual time of arrival at the end of the previous trip, from a desired time of arrival. Thereby, the balance parameter values are determined in dependence on an outcome of a machine learning process at a remainder of the previous trips, in dependence on the reward parameter values determined for respective earlier previous trips.

As an example, a previous trip may start at position zero and end at an end position pend. During the previous trip, balance parameter values will be determined in response to respective progress deviations, similar to as described above in relation to the present trip. When reaching the end position pend, a value of the reward parameter will be correlated with the present trip. The "better" the outcome of the balance parameter value determinations are, the larger reward will be.

As an example, the reward parameter may be defined as $$R = -\text{cost}_{oper} - \psi \quad (5)$$

where, Coper is the operating cost. As suggested above, the operating cost can include aspects such as fuel consumption, electricity consumption, battery degradation, and/or driver/operator salary. ψ is a penalty function. As depicted in FIG. 8a and FIG. 8b, for the arrival time, tend, at the end of the route, a time corridor may be provided between a minimum desired time of arrival, tmin, and a maximum desired time of arrival, tmax. In this example, the penalty function ψ is zero within the time corridor. The penalty function is non-zero outside of the time corridor. The penalty function may be defined as $$\Psi = \Psi viol + \Psi delay \quad (6)$$

$$\Psi viol = \Psi tmax \text{ if } tend > tmax, \text{ and } \Psi tmin \text{ if } tend < tmin \quad (7)$$

$$\Psi delay = \text{costdelay}*(tend - tmax) \text{ if } tend > tmax \quad (8)$$

Ψtmax, Ψtmin, and costdelay are herein referred to as consequence parameters. They define the consequences of arriving outside of the time corridor. FIG. 8a and FIG. 8b show examples of how Ψ depends on the arrival time, tend, and the consequence parameters. The non-zero consequence parameter values are assumed to have a positive values. FIG. 8a depicts an example, where the vehicle is heavily penalized for being late. This may be useful, e.g. if the delay results in a missed ferry departure. FIG. 8a depicts an example, which is useful for a situation where an added cost of an external resource is triggered. The situation may be e.g. unnecessary waiting for a goods unloading operator.

Figure 9:
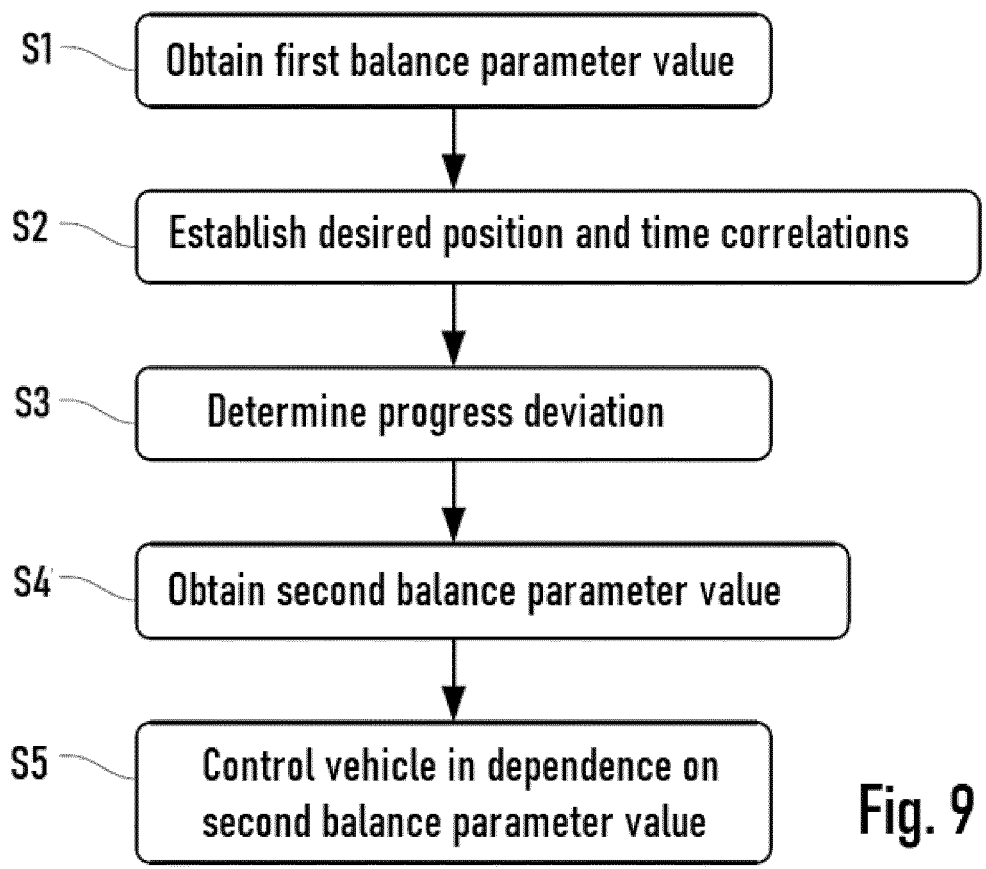
FIG. 9 is a flow diagram depicting steps in a method according to a more general embodiment of the invention.

Reference is made to FIG. 9, showing a flow diagram of a method according to a more general embodiment of the invention. The method comprises obtaining S1 a first value of a balance parameter, indicative of a balance between a cost for operating the vehicle along the route, and a time of arrival at an end of the route. The method further comprises establishing S2, in dependence on the first balance parameter value, a plurality of desired position and time correlations for the travel of the vehicle along the route. The method further comprises, when the vehicle travels along the route, determining S3 a progress deviation comprising a deviation, for a point in time, of an actual position of the vehicle from a desired position according to the desired position and time correlations, or a deviation, for a position of the vehicle, of an actual point in time from a desired point in time according to the desired position and time correlations. The method further comprises, when the vehicle travels along the route, obtaining S4 a second balance parameter value, different from the first balance parameter value, the second balance parameter value being dependent on the progress deviation. The method further comprises controlling S5 the vehicle in dependence on the second balance parameter value.

It is to be understood that the present invention is not limited to the embodiments described above and illustrated in the drawings; rather, the skilled person will recognize that many changes and modifications may be made within the scope of the appended claims.

The invention claimed is:

1. A method for controlling a vehicle travelling along a route, the method comprising,
    obtaining a first balance parameter value, indicative of a balance between a cost for operating the vehicle along at least a part of the route, and a time of arrival at a position along the route, wherein the first balance parameter value is determined as a value that provides a first velocity profile as resulting in the vehicle reaching an end of the route at a latest allowed point in time,
    determining a velocity profile, which is the first velocity profile,
    establishing, in dependence on the first balance parameter value, a plurality of desired position and time correlations for the travel of the vehicle along at least a part of the route,
    when the vehicle travels along the route, determining a progress deviation comprising a deviation, for a point in time, of an actual position of the vehicle from a desired position according to the desired position and time correlations, or a deviation, for a position of the vehicle, of an actual point in time from a desired point in time according to the desired position and time correlations,
    when the vehicle travels along the route, obtaining a second balance parameter value, different from the first balance parameter value, the second balance parameter value being dependent on the progress deviation,
    controlling the vehicle in dependence on the second balance parameter value;
    repeating a plurality of times, as the vehicle travels along the route, determining the progress deviation, obtaining the second balance parameter value dependent on the progress deviation, and controlling the vehicle in dependence on the second balance parameter value;
    repeating a plurality of times a determination, in dependence on the second balance parameter value, of the velocity profile for the vehicle for at least a portion of a remainder of the route, wherein the second balance parameter value, obtained in a repeated step of obtaining the second balance parameter value, replaces, for the velocity profile determination, the second balance parameter value obtained from obtaining the second balance parameter value,
    wherein the determination of the velocity profile is repeated more often than the obtaining of the second balance parameter value.

2. The method according to claim 1, characterized by determining, when the vehicle travels along the route, in dependence on the second balance parameter value, the velocity profile for the vehicle for at least the portion of the remainder of the route, and controlling the vehicle according to the velocity profile.

3. The method according to claim 2, characterized by obtaining a vehicle model in a form of a mathematical model for the vehicle, wherein the velocity profile is determined by the vehicle model.

4. The method according to claim 2, characterized by obtaining route data, wherein the velocity profile is determined in dependence on the route data.

5. The method according to claim 2, further comprising determining, in dependence on the first balance parameter value, the first velocity profile for the vehicle for at least a part of the route, and controlling the vehicle according to the first velocity profile, wherein a second velocity profile replaces the first velocity profile for the control of the vehicle.

6. The method according to claim 2, further comprising determining, in dependence on established desired position and time correlations, a draft velocity profile, and controlling the vehicle according to the draft velocity profile, wherein a second velocity profile replaces the draft velocity profile for the control of the vehicle.

7. The method according to claim 1, characterized by determining a plurality of balance parameter values, each for a respective progress deviation.

8. The method according to claim 1, characterized in that the vehicle performs, when travelling along the route, a present trip along the route, the method comprising performing, a plurality of times, previous trips along the route, or along a virtual reality route in a form of a virtual reality representation of the route, wherein the second balance parameter value is determined in dependence on the previous trips.

9. The method according to claim 8, characterized by determining, for each previous trip, a reward parameter value, in dependence of a deviation of an actual time of arrival at the end of the previous trip, from a desired time of arrival.

10. The method according to claim 9, characterized in that the second balance parameter value is determined in dependence on an outcome of a machine learning process at a remainder of the previous trips, in dependence on reward parameter values determined for respective earlier previous trips.

11. The method according to claim 1, characterized by determining an anticipated traffic situation along the route, and determining the second balance parameter value in dependence on the anticipated traffic situation.

12. The method according to claim 1, characterized by determining, in dependence on the second balance parameter value, the velocity profile for the vehicle for at least the portion of the remainder of the route, wherein the velocity profile is determined on-board the vehicle.

13. The method according to claim 1, characterized in that the second balance parameter value is determined by a control unit located remotely from the vehicle.

14. The method according to claim 1, characterized by determining, in dependence on the second balance parameter value, the velocity profile for the vehicle for at least the portion of the remainder of the route, wherein the velocity profile determination comprises establishing a sequence of velocity profile positions along the remainder of the route, or the portion of the remainder of the route.

15. The method according to claim 14, characterized by determining, for a pair of adjacent positions in the sequence of velocity profile positions, a vehicle velocity at one of the adjacent positions, and determining a plurality of candidate velocity changes, each providing a respecting vehicle velocity at an other of the velocity profile positions.

16. The method according to claim 15, characterized by determining, for each of a plurality of, or all of, the candidate velocity changes, a candidate cost.

17. The method according to claim 16, characterized in that each candidate cost is dependent on the cost of operating the vehicle between adjacent velocity profile positions, the time of driving between the adjacent velocity profile positions, and the second balance parameter value.

18. A method comprising starting a vehicle along a route; and performing the steps of claim 1 with a computer program comprising program code when said computer program is run on a computer, or a group of computers.

19. A non-transitory computer readable medium carrying a computer program comprising program code for performing the steps of claim 1 when said computer program product is run on a computer, or a group of computers.

20. A control unit, or a group of control units, configured to perform the steps of the method according to claim 1.

* * * * *